United States Patent [19]

Kato et al.

[11] Patent Number: 4,736,272

[45] Date of Patent: Apr. 5, 1988

[54] CURRENT-LIMITING ARCING HORN

[75] Inventors: Kazuaki Kato, Chita; Hiromi Nagasaka, Aichi, both of Japan

[73] Assignee: NGK Insulators, Ltd., Nagoya, Japan

[21] Appl. No.: 41,781

[22] Filed: Apr. 23, 1987

[30] Foreign Application Priority Data

Apr. 30, 1986 [JP] Japan .......................... 61-066386[U]

[51] Int. Cl.[4] .................................................. H02H 7/04

[52] U.S. Cl. ...................................... 361/138; 361/137

[58] Field of Search ............... 361/138, 137, 127, 126, 361/117; 174/140 R

[56] References Cited

U.S. PATENT DOCUMENTS 4,467,387 8/1984 Bergh et al. ........................ 361/137

FOREIGN PATENT DOCUMENTS 58-34228 3/1983 Japan .................................. 361/138
58-63844 4/1983 Japan .................................. 361/138
58-123523 8/1983 Japan .................................. 361/138
60-1461 1/1985 Japan .................................. 361/138
61-31454 9/1986 Japan .................................. 361/138

*Primary Examiner*—Robert S. Macon
*Attorney, Agent, or Firm*—Stephen G. Rudisill

[57] ABSTRACT

There is disclosed a current-limiting arcing horn comprising a current-limiting unit and a ring horn. The current-limiting unit is composed of lower and upper electrodes, at least one nonlinear resistor element mounted between the electrodes, and an insulating member made of an insulation. The insulating member encloses the electrodes and the nonlinear resistor element. The insulating member has a certain length which is 1.5 to 3.0 times as long as the length of the nonlinear resistor element. The creepage distance of the surface of the insulating means is 1.5 to 3.0 times as long as the length of the insulating member. The grounding electrode of the current-limiting unit is fixed to the earthside base of an insulator that holds an insulated wire. The ring horn is mounted to the upper electrode. An air gap is formed between the ring horn and the insulated wire to permit a flashover by lightning surge across the gap.

1 Claim, 3 Drawing Sheets

CURRENT-LIMITING ARCING HORN

FIELD OF THE INVENTION

The present invention relates to a current-limiting arcing horn used to prevent conductor burndown of insulated wire due to lightning flashovers on overhead distribution lines.

DESCRIPTION OF THE RELATED ART

When a flashover due to lightning surge causes breakage of the insulation layer of the wire power follow current arc begins concentrating at the breakage point of the insulation layer. As a result, the conductor is molten and broken down line post insulators are damaged, or other lightning fault takes place. In order to prevent such lightning fault, a current-limiting arcing horn is installed on overhead distribution lines.

More specifically, a current-limiting unit incorporates a nonlinear resistor element made of zinc oxide (ZnO). The lower side of the unit is installed via the earth side hardware of an insulator and a ring horn surrounding the insulator is mounted to the upper electrode of the current-limiting unit. Lightning surge voltage causes to flashover across a certain air gap formed between the ring horn and the live portion, the conductor, or a conductor holder, in order to suppress and interrupt the power follow current on the conductor. The air gap length is designed to have sufficient insulation level to prevent flashover due to overvoltage such as switching surge. That is, air gap is so formed that the current limiting arcing horn is operated only by lightning surges exceeding a designed level. Therefore, current-limiting arcing horns of this kind have larger external air gaps than the air gaps formed in ordinary lightning arresters. Practically, the electrostatic capacity $C_1$ of the air gap and the electrostatic capacity $C_2$ of the nonlinear resistor element are so set that the relation $C_1:C_2=1:10$ approximately holds. Therefore, nonlinear resistor element has only low voltage applied in normal conditions. Therefore the element scarcely deteriorates. Also, the element can be smaller than a lightning arrester. This current-limiting arcing horn functions in the manner described below. The high voltage of the lightning surge immediately reduces the proper resistance of the nonlinear resistor element. This allows the surge to be discharged to the ground. Immediately after the discharge of the surge, the nonlinear resistor element restores proper resistance. Thus, the insulation against the line voltage is recovered, and the power follow current is interrupted. In this way, the line faults due to power follow is preventable.

The power follow current is interrupted within 0.5 cycle of the AC voltage. The nonlinear resistor element of the current-limiting unit and a pair of electrodes coupled to both ends of the element are covered with elastic insulation material, such as rubber. As mentioned above, the current-limiting arcing horn has a long air gap to live portion. It is obvious that the current limiting arcing horn normally operates even under contaminated condition as described later.

However, when the insulator and the current-limiting unit are contaminated at such an extend that the equivalent salt deposit density is about 0.2 mg/cm$^2$ to 0.35 mg/cm$^2$, if flashovers occurs on the arcing horn, then a leakage current flows on the outside of the current-limiting unit. If this leakage current reaches a certain level, then power follow current interrupting performance tends to deteriorate. More specifically, if a flashover occurs on the arcing horn, then the surge current flows through the nonlinear resistor element of the current-limiting unit. At this time, a small portion of the current flows along the surface of the current-limiting unit and so even after the lightning surge is dicontinued, the power follow current continues to flow on the outside of the current-limiting unit as the leakage current. Normally, the power follow current is interrupted within 0.5 cycle, but under such heavy contaminated condition, the power follow current may continue to flow during about 1.0 to 2.0 cycles. Also, it has been found that this tendency becomes more conspicuous gradually, leading to deterioration in the current-limiting unit.

SUMMARY OF THE INVENTION

It is an object of the present invention to provide a current-limiting arcing horn having stable power follow current interrupting, whereby effectively preventing line faults due to lightning.

The above object is achieved by a current-limiting arcing horn comprising: a current-limiting unit consisting of lower and upper electrode, at least one nonlinear resistor element mounted between the electrodes, and an insulating means of a certain length that encloses the electrodes and the nonlinear resistor element, the insulating means being made of an insulator, the length of the insulating means being 1.5 to 3.0 times as long as the length of the nonlinear resistor element, the creepage distance of the insulating means being 1.5 to 3.0 times as long as the length of the insulating means, the lower electrode being fixed to an insulator; a ring horn mounted to the upper electrode; and an air gap formed between the ring horn and the insulated wire to permit surge voltage to flashover across the air gap.

Other objects of the invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENTS

Figure 1:
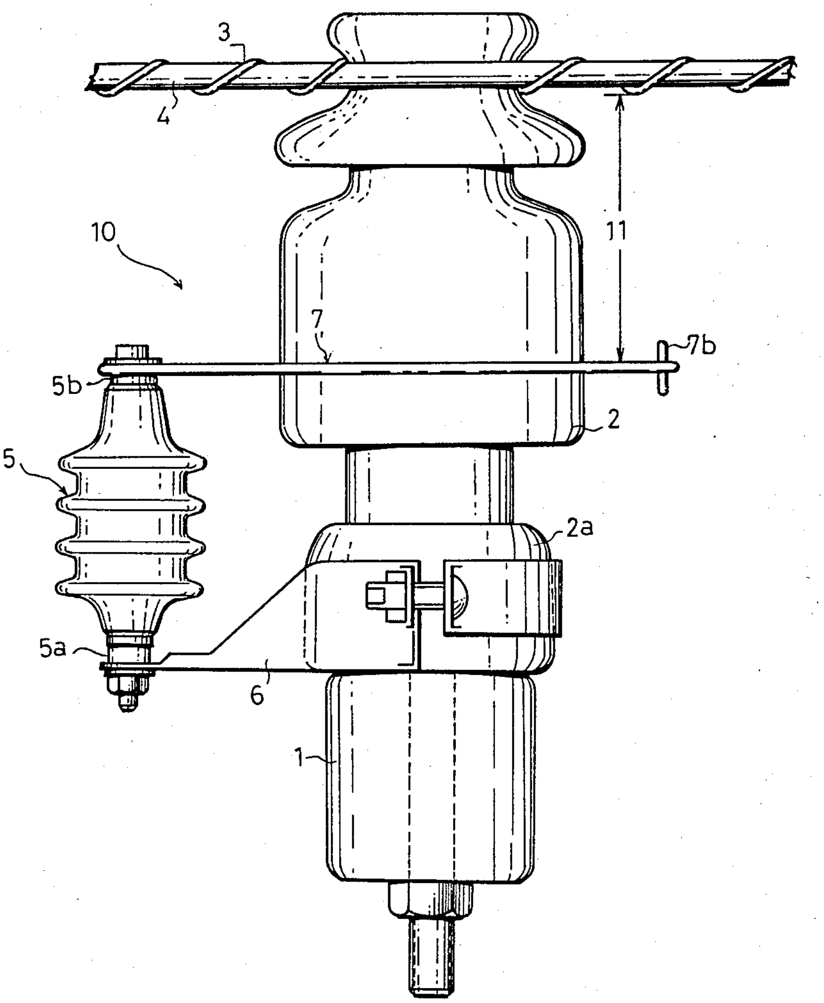
FIG. 1 is a front elevation of a current-limiting arcing horn according to the invention, for showing the manner in which the horn is mounted to distribution line.
Figure 2:
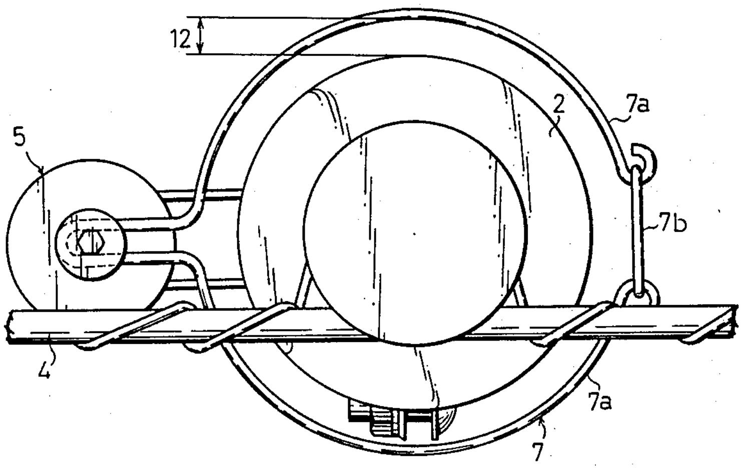
FIG. 2 is a plan view of the horn shown in FIG. 1.

Referring to FIG. 1, there is shown a current-limiting arcing horn embodying the concept of the invention. The arcing horn, generally indicated by reference numeral 10, is mounted to an insulator 2. An insulator 2 is fixed to a crossarm 1. The wire 4 is held to the head of the insulator 2 by a wire binder 3. The horn 10 has a current-limiting unit 5 including a lower electrode 5*a* and an upper electrode 5*b*. The lower electrode 5*a* is supported on fitting hardware 6. The fitting hardware 6 is fixed on the earth side base 2*a* of the insulator. A ring horn 7 is mounted to the upper electrode 5*b*. An air gap 11 is formed between the ring horn 7 and the wire binder 3 or the insulated wire 4. When excessive overvoltage is generated by lightning, a flashover occurs across the gap 11, and the surge is discharged to the ground via the current-limiting unit 5. As shown in FIG. 2, the ring horn 7 that is annular in shape comprises ring portions 7*a* made of a metal wire and a retaining ring 7*b* that holds the front ends of the ring portions 7*a*. The ring horn 7 surrounds the insulator 2 such that a gap 12 is left between them. The length of the gap 12 is so set that the flashover caused by lightning surge voltage shall always occur between the insulated wire 4 and the ring horn 7.

Figure 3:
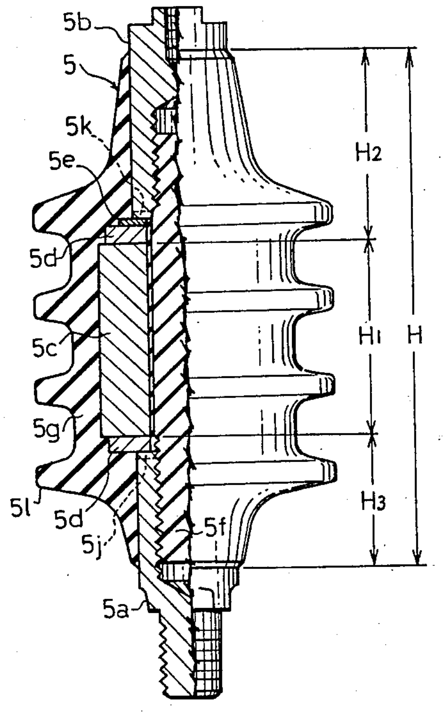
FIG. 3 is a front elevation partially in cross section of one example of a current-limiting unit for use in a current limiting arcing horn according to the invention.

Referring to FIG. 3, a cylindrical nonlinear resistor element 5*c* made of zinc oxide (ZnO) is mounted between the lower electrode 5a and the upper electrode 5*b* of the current-limiting unit 5. Conductors, such as collecting plates 5*d* and belleville springs 5*e*, are mounted between the lower electrode 5*a* and the nonlinear resistor element 5*c* and between the upper electrode 5*b* and the nonlinear resistor element 5*c*. An insulating rod 5*f* is made of an fiberglass-reinforced plastic, and its both ends are screwed to the electrodes 5*a* and 5*b* to connect these electrodes together. The nonlinear resistor element 5*c* is tightened between the electrodes 5*a* and 5*b* by the insulating rod 5*f*. An insulating sheath 5*g* molded by an elastic material, such as ethylene propylene rubber, is formed around the nonlinear resistor element 5*c* and the electrodes 5*a*, 5*b*. The length H of the sheath 5*g* is 1.5 to 3 times as long as the length $H_1$ of the nonlinear resistor element 5*c*, i.e., $1.5 \leqq H/H_1 \leqq 3.0$. The sheath 5*g* is formed over the whole outer periphery of the nonlinear resistor element 5*c* and over the electrodes 5*a* and 5*b*.

The end surfaces of the electrodes 5*a* and 5*b* which face the nonlinear resistor element 5*c* and provided with grooves 5*j* and 5*k*, respectively. When the sheath 5*g* is molded, the insulation material is introduced into the space formed between the nonlinear resistor element 5*c* and the insulating rod 5*f* through the grooves 5*j* and 5*k* to form an insulation layer which enhances the internal insulation. In this example, the portions $H_2$ and $H_3$ of the height H of the sheath 5*g* which are assigned to the electrodes 5*a* and 5*b* are different, but normally they may be substantially the same. The sheath 5*g* is provided with ridges 5l so that the creepage distance L may be 1.5 to 3.0 times as long as the length H of the sheath 5*g*, i.e., $1.5 \leqq L/H \leqq 3.0$.

Figure 4:
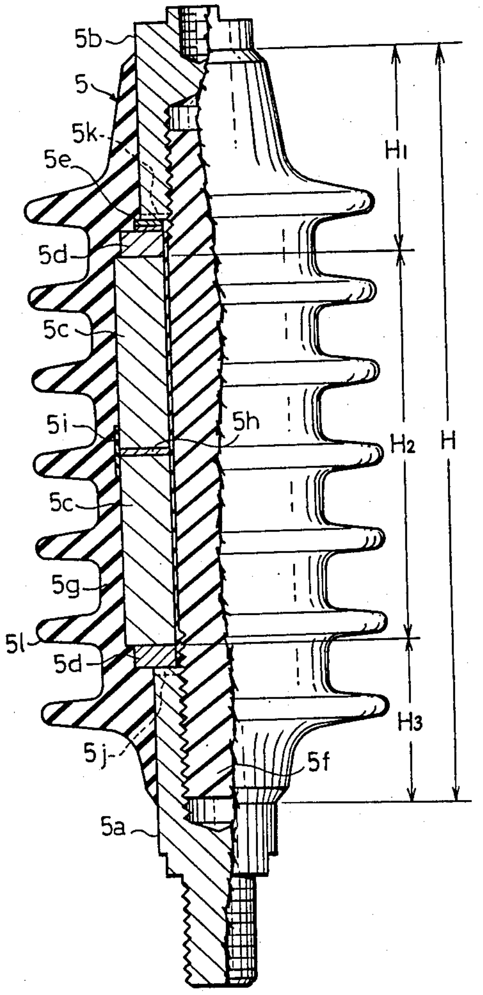
FIG. 4 is a view similar to FIG. 3 but showing another example of a current-limiting unit.
Figure 3:
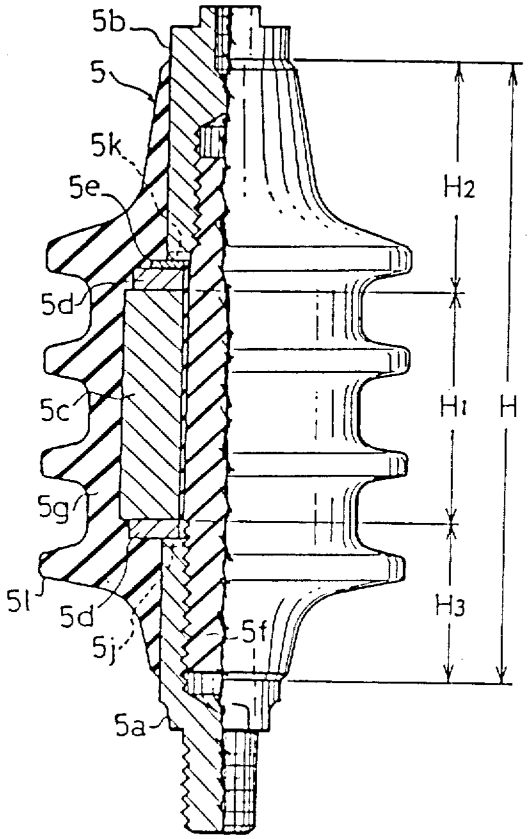
Figure 4:
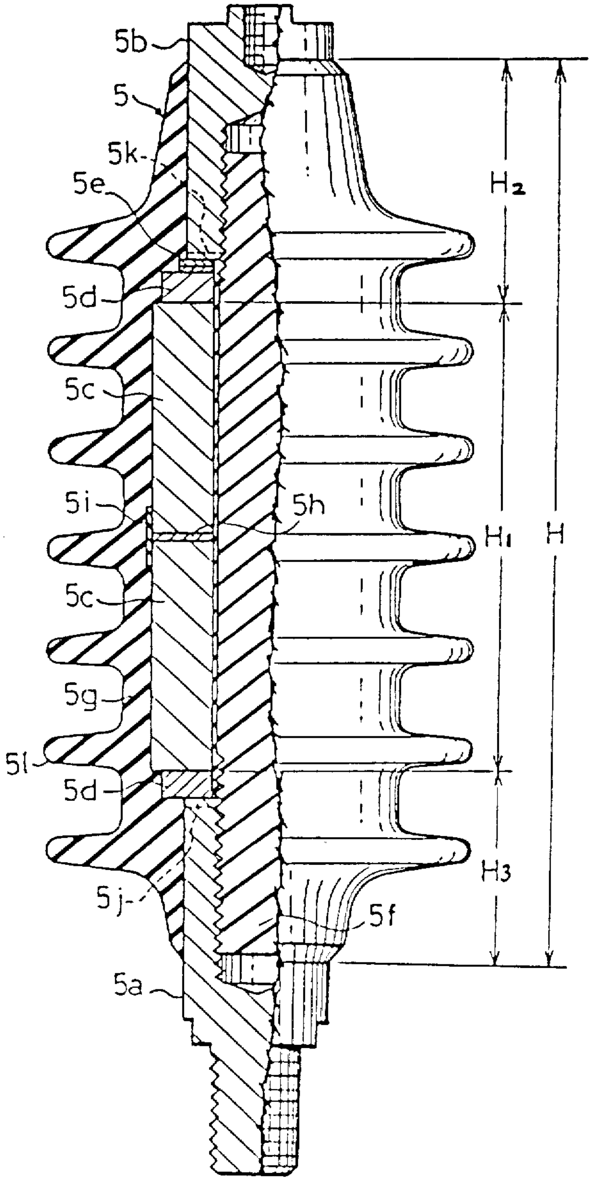

Referring next to FIG. 4, there is shown another example of the current-limiting unit 5. This unit 5 has two nonlinear resistor elements 5*c* between which a collecting plate 5*h* is interposed. In the same manner as in the foregoing example, the nonlinear resistor elements 5*c* are tightened between both electrodes 5*a* and 5*b*. An insulating sheath 5*g* is formed over them. Thus, the length H of the sheath 5*g* is 1.5 to 3.0 times as long as the total length $H_1$ of the two nonlinear resistor elements 5*c*. Also, the ratio of the creepage distance L to the length H of the sheath is the same as in the first example. An insulating ring band 5*i* made of a rubber or heat-shrinkable plastic is mounted surrounding the collecting plate 5*h* and the surfaces of the nonlinear resistor elements 5*c* to prevent the insulation material from being injected between the end surfaces of two nonlinear resistor elements 5*c* when the sheath 5*g* is molded.

The current-limiting unit 5 shown in FIGS. 1–3 is designed for a system voltage of 6 KV, while the unit 5 shown in FIG. 4 is designed for a system voltage of 11 KV. The present invention is also applicable to a current-limiting arcing horn having more nonlinear resistor elements.

Figure 5:
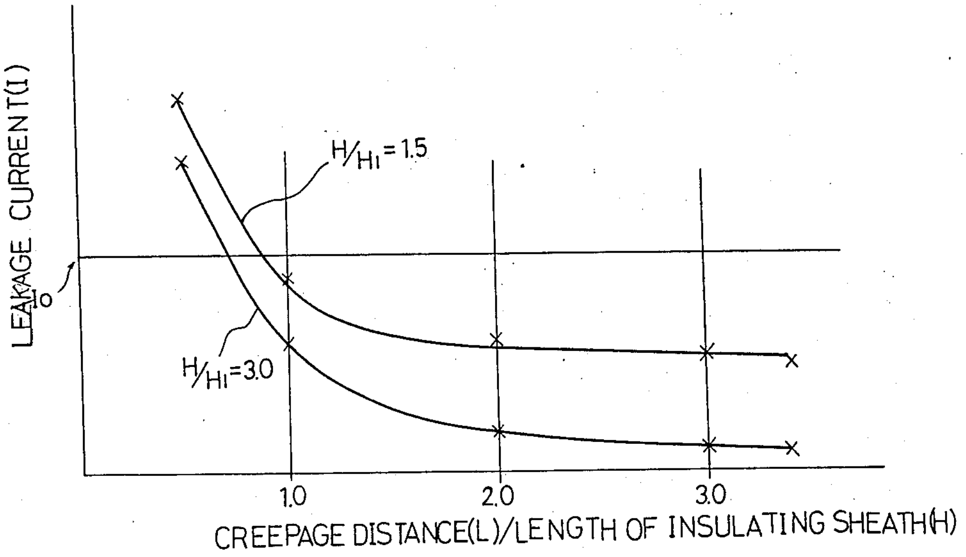
FIG. 5 is a graph showing the results of 50% lightning impulse flashover voltage tests conducted to measure the leakage current flowing on a current-limiting arcing horn according to the invention.

The operation of the novel current-limiting arcing horn is now described. Leakage currents flowing on current-limiting arcing horns using the current-limiting units 5 shown in FIGS. 3 and 4, respectively, were measured under the condition that their surfaces were contaminated. The results of the measurements are shown in FIG. 5. It can be seen from this graph that the magnitude of the leakage current I flowing on each unit 5 varies greatly, depending on the relation of the length H of the insulating sheath 5*g* to the length $H_1$ of the nonlinear resistor element 5*c* and on the relation of the creepage distance L to the length H of the sheath 5*g*. Obviously, the length H of the sheath 5*g* of the current-limiting unit 5 and the creepage distance L affect the leakage current I flowing between the electrodes 5*a* and 5*b*. Tests were carried out to assess the power follow current interrupting performance under the various lengths of the air gap 11 and various levels of lightning impulse voltage. It has been found that the current-limiting arcing horn operates suitably when the leakage current $I_0$ is within from 10 mA to tens of milliamperes. As can be understood from the graph of FIG. 5, the present invention effectively suppresses the leakage current I on the current-limiting unit 5, thus permitting appropriate interrupting of power follow current.

Although it is desired to increase the length H of the sheath and the creepage distance L, the performance is hardly improved with increasing the length H and the distance L after certain dimensions are reached, as can be seen from the graph of FIG. 5. Practically, therefore, they should be set within the ranges difined by the appended claim to minimize the current-limiting unit and to reduce the cost.

As described in detail thus far, the novel current-limiting arcing horn has a current-limiting unit including at least one nonlinear resistor element and both electrodes which are effectively insulated and enclosed by an insulating sheath. Therefore, the performance of the current-limiting unit does not deteriorate. Hence, the performance can be stably maintained. Consequently, the novel device can effectively prevent the lightning faults on overhead distribution line.

As many apparently widely different embodiments may be made without departing from the spirit and scope thereof, it is to be understood that the invention is not limited to the specific embodiments thereof except as defined in the appended claim.

What is claimed is:

1. A current-limiting arcing horn comprising:

a current-limiting unit including lower and upper electrodes, at least one nonlinear resistor element mounted between the electrodes, and an insulating means of a certain length H that encloses the electrodes and the nonlinear resistor element, the insulating means being made of an insulator, the length H of the insulating means being so set that the relation $1.5 \leqq H/H_1 \leqq 3.0$ holds, where $H_1$ is the length of the nonlinear resistor element, the creepage distance L of the surface of the insulating means being so set that the relation $1.5 \leqq L/H \leqq 3.0$ holds, the lower electrode being fixed to the earth side base of an insulator that holds an insulated wire;

a ring horn mounted to the upper electrode; and an air gap formed between the ring horn and the insulated wire to permit a flashover by lightning surge across the gap.

* * * * *

UNITED STATES PATENT AND TRADEMARK OFFICE
CERTIFICATE OF CORRECTION

PATENT NO. : 4,736,272

DATED : Apr. 5, 1988

INVENTOR(S) : Kato Kazuaki, et al.

It is certified that error appears in the above-identified patent and that said Letters Patent is hereby corrected as shown below:

The sheet of drawing consisting of Figs. 3 and 4, should be deleted and therefor, substitute the attached sheet of drawing consisting of Figs. 3 and 4.

Signed and Sealed this

Eighteenth Day of July, 1989

*Attest:*

DONALD J. QUIGG

*Attesting Officer*

*Commissioner of Patents and Trademarks*